United States Patent [19]

Mumme

[11] Patent Number: 5,379,444
[45] Date of Patent: Jan. 3, 1995

[54] ARRAY OF ONE-BIT PROCESSORS EACH HAVING ONLY ONE BIT OF MEMORY

[75] Inventor: Malcolm A. Mumme, South Pasadena, Calif.

[73] Assignee: Hughes Aircraft Company, Los Angeles, Calif.

[21] Appl. No.: 255,294

[22] Filed: Jun. 7, 1994

Related U.S. Application Data

[63] Continuation of Ser. No. 106,771, Aug. 11, 1993, abandoned, which is a continuation of Ser. No. 970,978, Nov. 3, 1992, abandoned, which is a continuation of Ser. No. 386,933, Jul. 28, 1989, abandoned.

[51] Int. Cl.[6] ............................................. G06F 15/16
[52] U.S. Cl. ........................ 395/800; 364/DIG. 1; 364/DIG. 2; 364/228; 364/229; 364/231.9; 364/923.5; 364/923.6
[58] Field of Search ................ 364/DIG. 1 MS File, 364/DIG. 2 MS File; 395/800

[56] References Cited

U.S. PATENT DOCUMENTS

| 3,699,534 | 10/1972 | Kautz | 395/800 |
| 4,314,349 | 2/1982 | Batcher | 364/716 |
| 4,380,046 | 4/1983 | Fung | 395/800 |
| 4,507,748 | 3/1985 | Cotton | 364/749 |
| 4,709,327 | 11/1987 | Hillis et al. | 364/200 |
| 4,739,474 | 4/1988 | Holsztynski | 364/200 |
| 4,907,148 | 3/1990 | Morton | 364/200 |

*Primary Examiner*—Robert Harrell
*Attorney, Agent, or Firm*—Leonard A. Alkov; W. K. Denson-Low

[57] ABSTRACT

A mesh processor array including a plurality of one-bit processor cells arranged in a matrix. Each processor receives inputs from adjacent processors or external sources and performs a logical function involving its own present state and the inputs thereto. Control circuitry provides control information indicative of a logical function to be performed to each of the processors in parallel, and pattern selection circuitry enables selected ones of the processors to respond to the control information.

7 Claims, 4 Drawing Sheets

2+3=5

FIG. 6A COPY
FIG. 6B
FIG. 6C XOR
FIG. 6D XOR
FIG. 6E OR
FIG. 6F
FIG. 6G AND
FIG. 6H
FIG. 6I COPY
FIG. 6J
FIG. 6K XOR
FIG. 6L
FIG. 6M → 5

ARRAY OF ONE-BIT PROCESSORS EACH HAVING ONLY ONE BIT OF MEMORY

This is a continuation of Ser. No. 08/106,771, filed Aug. 11, 1993 now abandoned, which is a continuation of Ser. No. 07/970,978, filed Nov. 3, 1992, now abandoned which is a continuation of Ser. No. 07/386,933, now abandoned filed Jul. 28, 1989.

BACKGROUND OF THE INVENTION

The subject invention is directed generally to mesh processing arrays, and is more specifically directed to a one-bit mesh processor and a mesh processor array architecture that utilizes the one-bit processor.

A mesh processing array is a form of parallel processing wherein generally identical mesh processors are interconnected in a grid-like fashion, for example, in rows and columns. Each processor is coupled to processors adjacent thereto (e.g., a maximum of four in a row and column configuration) with data input/outputs being provided via the processors on the periphery of the grid array. Commonly, the processors receive control signals (e.g., control words or op-codes) in parallel and are clocked in parallel.

Examples of known mesh processor arrays include the NCR 45CG72 array processor and the AMT DAP array process sor.

An important consideration with some known mesh processors arrays is the allocation of dedicated storage (memory) per processor cell which is typically not sufficiently large (e.g., 128 bits) except for few applications. Greater memory requirements are met by the use of a virtual processor cell comprising a plurality of real processor cells, which generally results in wasted memory since the virtual cell memory is an integral multiple of the real cell memory size.

A further consideration with known mesh processor arrays is the use of special function units or other special hardware which is utilized only part of the time, and therefore is not efficiently utilized.

As a result of large memories and special hardware, known processor arrays are quite large and cannot be operated at high clock rates.

SUMMARY OF THE INVENTION

It would therefore be an advantage to provide a mesh processor that is not complex and is efficiently utilized in a mesh processor array.

Another advantage would be to provide a mesh processor and array which can be clocked at a high rate.

A further advantage would be to provide a mesh processor and array which provide computational flexibility.

Another advantage would be to provide a mesh processor and array which provide for efficient memory utilization.

The foregoing and other advantages are provided by the invention in a mesh processor array which includes a plurality of one-bit processor cells arranged in a matrix. Each processor receives inputs from adjacent processors or from external sources and performs a logical function involving its own present output and the inputs thereto. Control circuitry provides control information indicative of a logical function to be performed to the each of the processors in parallel, and selection circuitry enables selected ones of the processors to respond to the control information.

BRIEF DESCRIPTION OF THE DRAWING

The advantages and features of the disclosed invention will readily be appreciated by persons skilled in the art from the following detailed description when read in conjunction with the drawing wherein:

FIGS. 6A, 6B, 6C, 6D, 6E, 6F, 6G, 6H, 6I, 6J, 6K, 6L, 6M schematically illustrate a specific example of the process for modulo 8 addition with a mesh processor array which includes processors as illustrated in FIGS. 4 and 5.

DETAILED DESCRIPTION

Figure 1:
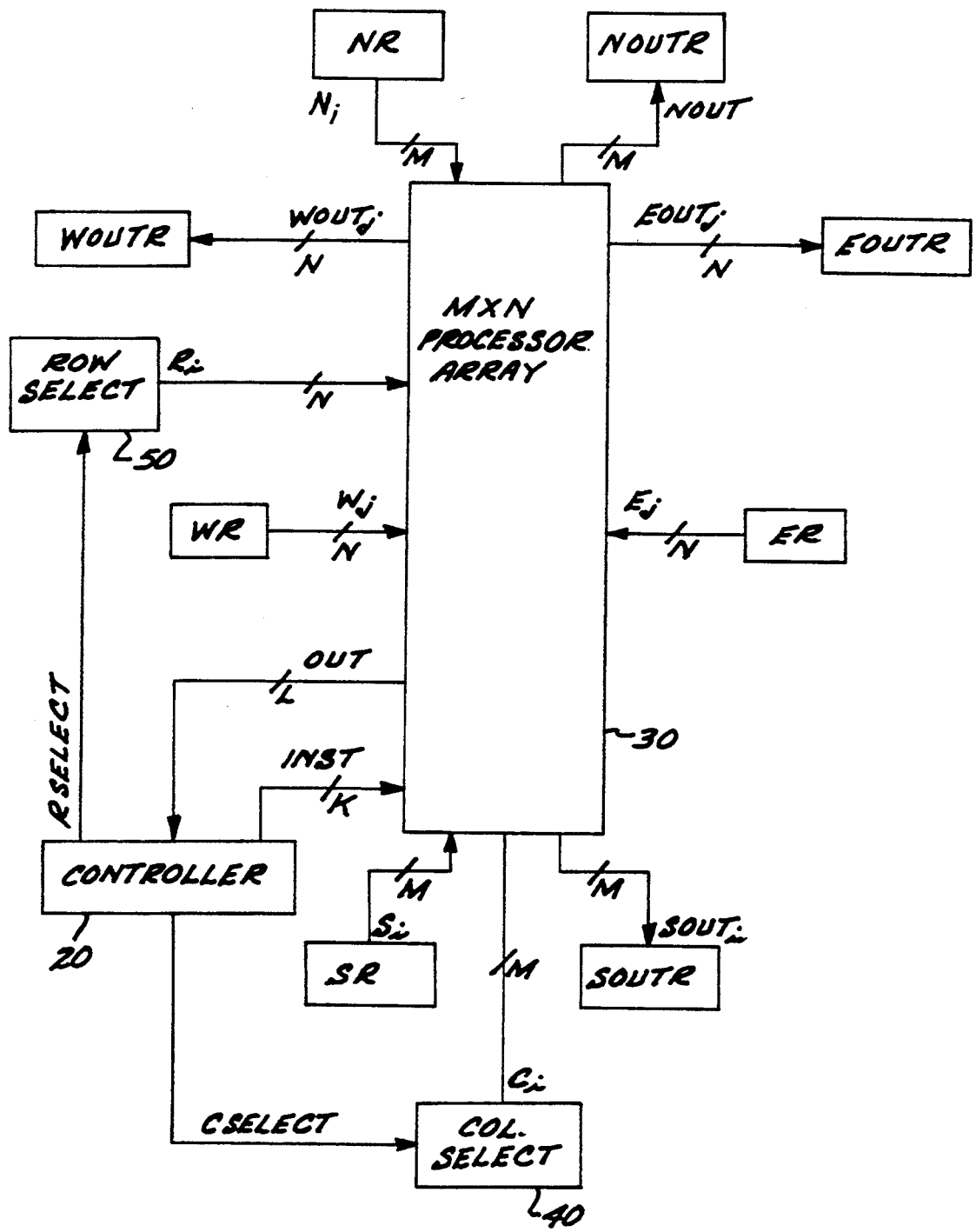
FIG. 1 is a block diagram of a mesh processor array in accordance with the invention.

In the following detailed description and in the several figures of the drawing, like elements are identified with like reference numerals.

Referring now to FIG. 1, shown therein are block diagram of a mesh processor array 10 that includes a controller 20 for controlling the operation of a processor array 30 that includes one-cell processors arranged in a grid of M columns by N rows. The controller 20 provides a K-bit op-code INST to each of the processors of the array 30. The controller 20 further provides a column pattern word CSELECT to a column select circuit 40, and provides a row pattern word RSELECT to a row select circuit 50. The output(s) OUT of L predetermined processors can be provided to the controller 20, where L is zero or greater. Such outputs are advantageously utilized with data dependent algorithms to control the contents of the op-code INST.

The column select circuit 40 provides M one-bit column select outputs $C_i$, each of which is coupled to all of the processors of the $i^{th}$ column. The row select circuit 50 provides N one-bit row select outputs $R_j$, each of which is coupled to all of the processors of the jrow. By way of illustrative example, the column pattern word CSELECT identifies which of the column select outputs $C_i$ are active, while the row pattern word RSELECT identifies which of the row select outputs $R_j$ are active. It should be appreciated that the column select circuit 40 and the row select circuit 50 can be configured to include internal memory for storing the current states of the column and row patterns to provide other processor addressing procedures which can be based on the stored pattern information.

Figure 2:
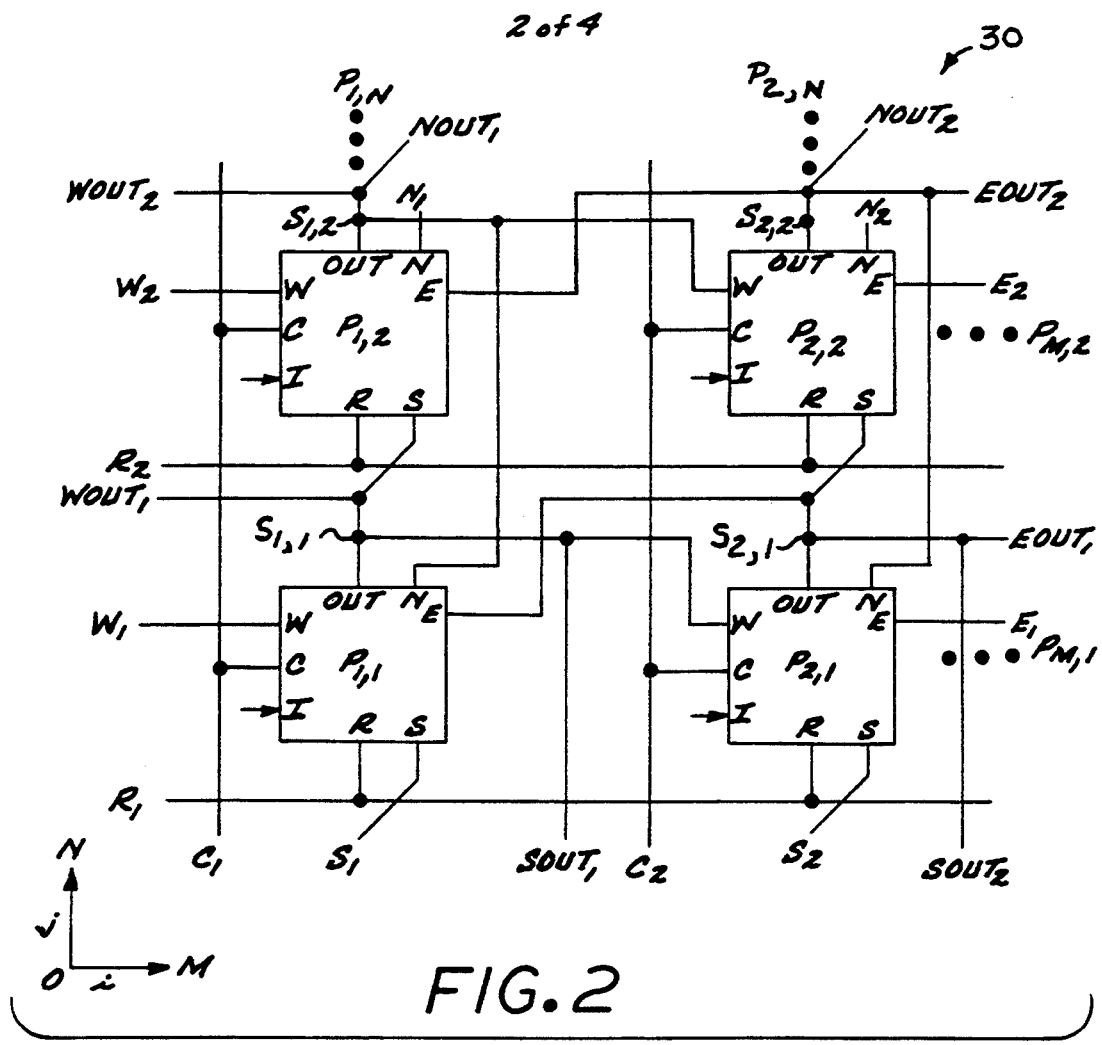
FIG. 2 is a block diagram showing the interconnection of the processors of the mesh processor array of FIG.

As more specifically shown in FIG. 2, the processor array 30 comprises M×N one-cell processors $P_{i,j}$, wherein each processor $P_{i,j}$ provides one data output, and can receive up to four (4) data inputs at the inputs labelled N, S, E, W, which refer to the compass references north, south, east, west that provide convenient references as to the origination of the inputs. The input at N is from above the processor, the input at S is from below, the input at E is from the right, and the input at W is from the left.

Each processor is configured to perform logical functions involving the present output of the processor and- /or any or all of the inputs to the processor. The operands and the logical function would be defined by the op-code INST.

More particularly as to the inputs to the respective processors, each processor other than those on the perimeter of the array receives as its four (4) inputs the outputs from its four (4) orthogonally adjacent processors. Each processor on the perimeter of the array but not at the corners receives three inputs from the respective outputs of the three (3) orthogonally adjacent processors, and further can receive an external input. The processors at the corners of the array receive two (2) inputs from the respective outputs of the two orthogonally adjacent processors, and further can receive two external inputs.

The external inputs can be provided to the processors on the perimeter of the array along the the north, south, east and west edges. The inputs along such edges are identified as $N_i$, $S_i$, $E_j$, $W_j$ wherein $i=1$, M and $j=1$, N. As defined above, there are M columns and N rows of processors. The external inputs are conveniently made available by input registers NR, SR, ER, WR, respectively associated with the N, S, E, W edges of the array and schematically depicted in FIG. 1.

By identifying external inputs to the array with the letter S and subscripts consistent with the designation of the outputs $S_{i,j}$ of the processors $P_{i,j}$, (i.e., treating the external inputs as if they were outputs of an additional column or row of processors), the inputs to the array can be defined as follows:

North: $N_i=S_{i,j}$, where $i=1$, M and $j=N+1$
South: $S_i=S_{i,j}$, where $i=1$, M and $j=0$
East: $E_j=S_{i,j}$, where $i=N+1$ an $j=1$, N
West: $W_j=S_{i,j}$, where $i=0$ and $j=1$, N The output $S_{i,j}$ of each processor $P_{i,j}$ can be coupled up to four locations, namely as inputs to any orthogonally adjacent processor or as an external output. Thus, the output of each processor other than those on the perimeter of the processor array is provided as an input to each of the four (4) orthogonally adjacent processors. The output of each processor on the perimeter but not at the corners is provided as an input to each of the three (3) orthogonally adjacent processors and is available as an external output. The output of each processor at the corners of the array is provided as an input to each of the two (2) orthogonally adjacent processors and is available as two external outputs.

In terms of the compass references being utilized, the external outputs are provided by the processors along the north, south, east, and west edges of the array, and are respectively identified at $NOUT_i$, $SOUT_i$, $EOUT_i$, and $WOUT_j$, wherein $i=1$, M and $j=1$, N. As defined above, there are M columns and N rows of processors. The external outputs are conveniently provided to output registers NOUTR, SOUTR, EOUTR, WOUTR, respectively associated with the N, S, E, W edges of the processor array same. Thus, for example, $NOUT_M$ is identical to $EOUT_N$ It should be noted that for ease of reference, the outputs at the corners of the processor array are the since both are provided by the processor $P_{M,N}$. The processor array outputs could be organized differently, but this organization maintains consistency with the column and row organization.

Since the outputs of the processor array are outputs of processors at the edges of the processor array, the outputs of the array can be denoted as follows:

North: $NOUT_1=S_{i,j}$, where $i=1$, M and $j=N$
South: $SOUT_i=S0$ where $i=1$, M and $j=1$
East: $EOUT_j=S_{i,j}$, where $i=M$ and $j=1$, N
West: $WOUT_j=S_{i,j}$, where $i=1$ and $j=1$, N It is noted that although inputs to the processor array can be provided at all four edges and outputs from the processor array are available at all four edges, not all available inputs and outputs need be utilized. For example, a single input register and a single output register might utilized, such as the input register NR for inputs to the processors along the north edge and the output register SOUTR for outputs along the south edge. The discussion of inputs and outputs along each edge is to illustrate the general architecture of the mesh processor array.

As further shown in FIG. 2, each processor $P_{i,j}$ includes a column select input C for receiving the column select signal $C_i$ and a row select input R for receiving the row select signal $R_j$. As discussed above, the column select signals $C_i$ and the row select signals $R_j$ are respectively provided by the column select circuit 40 and the row select circuit 50. Each processor also includes a K-bit wide input I for receiving tile K-bit op-code INST from the controller 20.

In operation, the processors of the array operate synchronously in parallel, with the clocking being provided by the column and row select signals which also determine which processors are active in a given clock cycle. Specifically, a processor $P_{i,j}$ is active or selected if the column and row selected $C_i$ and $R_j$ are both active. If a processor $P_{i,j}$ is active, the state of its one-bit output $S_{i,j}$ could change, depending on the op-code word INST; otherwise, the state of its output does not change.

As indicated previously, each processor is configured to perform a logical function involving the present output of the processor and/or any or all of the inputs to the processor. An illustrative example which will now be discussed is a processor that can perform a 2-operand logical operation involving the present state of the processor and a selected input.

In the illustrative example of a 2-operand processor, the op-code word INST defines (a) which of the inputs to the processor will be used as the second operand in a logical operation having the present state of the processor output as the first operand, and (b) the logical operation to be performed. It should be appreciated that the logical operation is performed on the present states of the inputs and the output of a given processor $P_{i,j}$. Since each processor receives four (4) one-bit data inputs, a 2-bit direction field in the op-code word is utilized to define which of the data inputs is the INST second operand. The remaining portion of the op-code word INST comprises an operation field which defines the logical operation to be performed. For example, a 4-bit operation field (i.e., $K=6$) can define 16 logical operations. By way of specific example, the first two bits I1, I2 of the op-code comprise the direction field, while the remaining four bits I3, I4, I5, I6 comprise the operation field.

For the illustrative example of a 2-bit direction field and a 4-bit operation field, the following Table I identifies the input selected as the second operand for a selected processor $P_{i,j}$ pursuant to the values of the direction field wherein $I_2$ is the LSB and $I_1$ is the MSB. Table I specifically identifies the selected input by processor input (N, S, E, W) and also by location in the array from where the input originates relative to $P_{i,j}$. As discussed above, the input selected can be an external input.

TABLE I

| Direction Field | Input Selected | Source of Input |
|---|---|---|
| 00 | E | $S_{i+1,j}$ |
| 01 | N | $S_{i,j+1}$ |
| 10 | W | $S_{i,j-1}$ |
| 11 | S | $S_{i-1,j}$ |

The following Table II identifies illustrative logical operations represented by the different values of the operation field of the op-code, where the input to the processor selected as the second operand is identified as B, $I_6$ is the LSB, and $I_3$ is the MSB.

TABLE II

| Operation Field | Logical Operation | Description |
|---|---|---|
| 0000 | FALSE | CLEAR |
| 0001 | $S_{i,j}$ AND $\underline{B}$ | AND |
| 0010 | $S_{i,j}$ AND $\overline{B}$ | AND NOT |
| 0011 | $\underline{S_{i,j}}$ | NOP |
| 0100 | $\overline{S_{i,j}}$ AND B | NOT AND |
| 0101 | B | COPY (MOVE) |
| 0110 | $S_{i,j}$ XOR B | XOR |
| 0111 | $S_{i,j}$ OR B | OR |
| 1000 | $S_{i,j}$ NOR B | NOR |
| 1001 | $\underline{S_{i,j}}$ = B | EQV |
| 1010 | $\overline{B}$ | COPY INVERSE |
| 1011 | $\underline{S_{i,j}}$ OR $\overline{B}$ | OR NOT |
| 1100 | $\overline{S_{i,j}}$ | INVERT |
| 1101 | $\overline{S_{i,j}}$ OR B | NOT OR |
| 1110 | $S_{i,j}$ NAND B | NAND |
| 1111 | TRUE | SET |

(XOR denotes the exclusive OR function)

Based on the foregoing, the new outputs $S'_{i,j}$ of each active or selected processor $P_{i,j}$ (i.e., $C_i$ and $R_j$ are both active) can be defined as follows:

$$S'_{i,j} = F(S_{i,j}, B)$$

where F is the logical function defined by the op-code operation field in accordance with Table II; $S_{i,j}$ is the present output of the processor $P_{i,j}$ and is the first operand; and B is the second operand and selected from the inputs to the processor pursuant to the op-code direction field in accordance with Table I.

Figure 3:
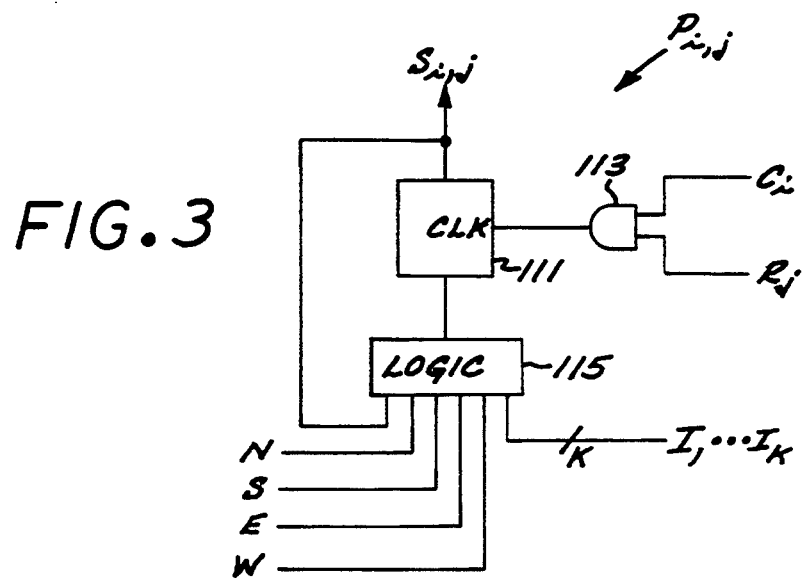
FIG. 3 is a generalized circuit schematic of mesh processor in accordance with the in invention.

Referring now to FIG. 3, shown therein is a generalized schematic of a processor $P_{i,j}$ in accordance with the foregoing illustrative example of a 6-bit op-code having a 2-bit direction (selection) field and a 6-bit operation field. The processor $P_{i,j}$ includes a clocked one-bit memory cell 111 which can be implemented with a D-type flip-flop, for example. The clock input for the one-bit memory cell is provided by an AND gate 113 which is responsive to the column and row select signals $C_i$, $R_j$. A logic circuit 115 is responsive to the output of the memory cell 111, the op-code word INST, and the four (4) inputs to the processor. The output of the logic unit 115 is the result of the two-operand logical operation performed with the two operands comprising (a) the output of the memory cell 111 and (b) one of the inputs to the processor.

Figure 4:
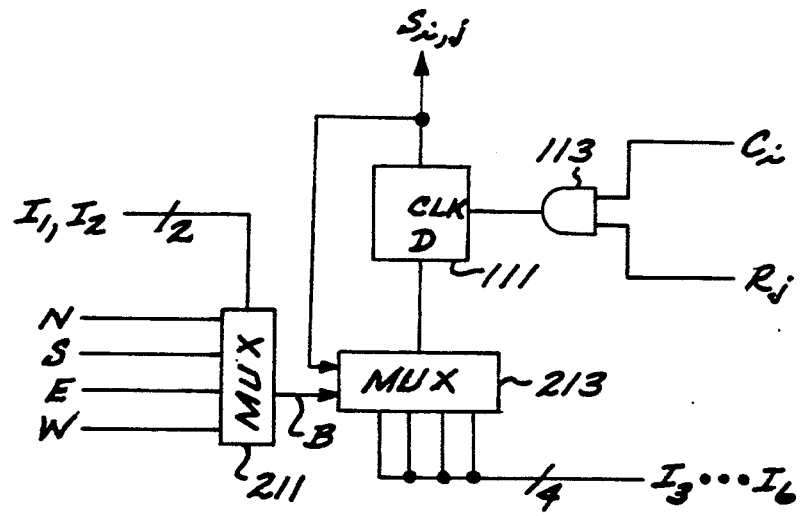
FIG. 4 is a circuit schematic of a specific implementation of the mesh processor of FIG. 3.

Referring now to FIG. 4, shown therein is a schematic of the processor $P_{i,j}$ of FIG. 3 showing illustrative example implementations of the logic circuit 115 and the one-bit memory cell 111. The logic circuit 115 specifically includes a 4-to-1 multiplexer 211 which receives the 2 bits $I_1$, $I_2$ of the direction field of the op-code word INST as its select inputs. The four data inputs to the multiplexer 211 are provided by the N, S, E, W inputs to the processor. The output of the multiplexer 211 is one of the N, S, E, W inputs and is the second operand B.

The logic circuit 110 further includes another 4-to-1 multiplexer 213 which receives the output $S_{i,j}$ of the memory cell 111 and the output B of the multiplexer 211 as its select inputs. The data inputs to the multiplexer 213 are the 4 bits I3, I4, I5, I6 of the operation field of of the op-code word INST. The output of the multiplexer is provided to the D-input of a clocked D-type flip-flop 213 which comprises the one-bit memory cell 111.

Figure 5:
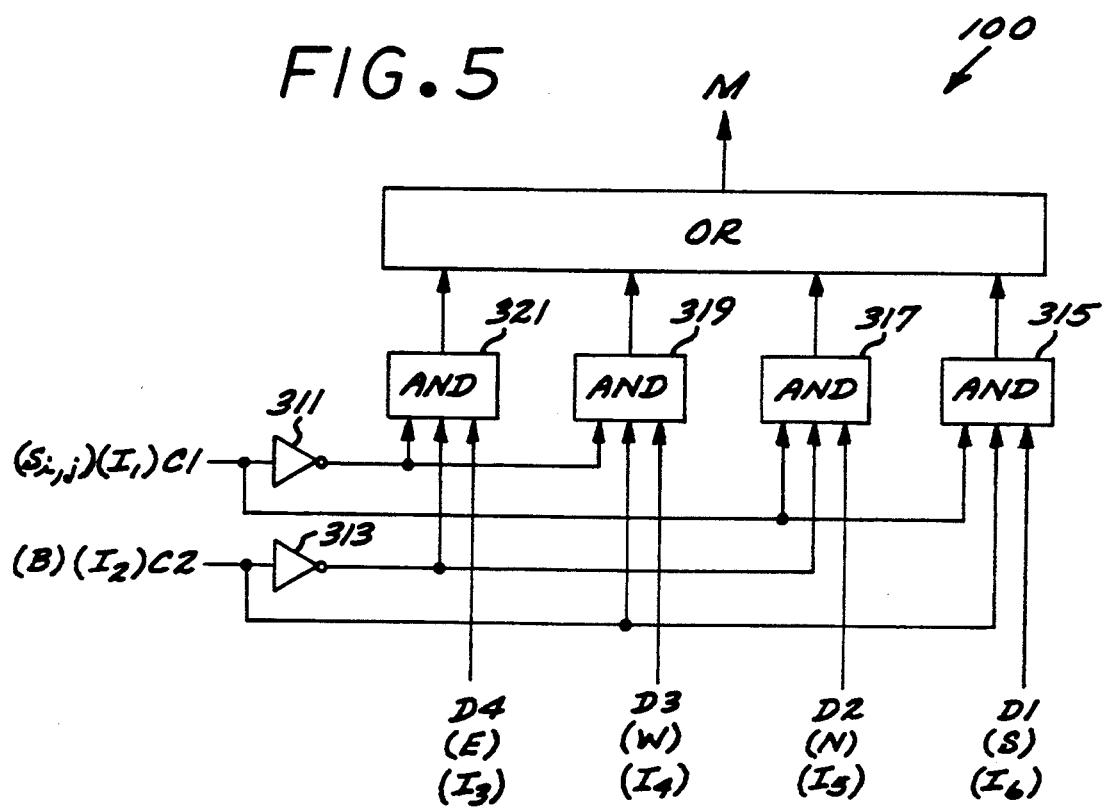
FIG. 5 is a circuit schematic of a specific implementation of the multiplexers of the circuit of FIG. 4.

Referring now to FIG. 5, shown therein is multiplexer 100 which can be utilized as the 4-to-1 multiplexers 211 and 213 in the processor of FIG. 4. The multiplexer 100 includes first and second inverters 311, 313 responsive to the select signals C1, C2 for providing complements C1', C2'. The select signal C1 is provided as inputs to three-input AND gates 315, 317, while the complementary select signal C1' is provided as inputs to three-input AND gates 319, 321. The select signal C2 is provided as inputs to the AND gates 315, 319, and the complementary select signal C2' is provided as inputs to the AND gates 317, 321. The other inputs to the AND gates 315, 317, 319, 321 are provided respectively by data inputs D1, D2, D3, D4.

For use as the multiplexer 211, the direction field bits I1, I2 are respectively provided as the select inputs C1, C2; and the processor inputs S, N, W, E are respectively provided as the data inputs D1, D2, D3, D4. These specific inputs to the multiplexer are indicated parenthetically on FIG. 5, and provide the operations set forth in Table I above. The output of the multiplexer 211 is the second operand B.

For use as the multiplexer 213, the operands $S_{i,j}$ and B are respectively provided as the select inputs C1, C2; and the operation field bits I6, I5, I4, I3 of the op-code are respectively provided as the data inputs D1, D2, D3, D4. These specific inputs to the multiplexer are indicated parenthetically on FIG. 5, and provide the operations set forth in Table II above. Essentially, the operation field bit pattern for each different operation includes the truth table for that operation. The output of the multiplexer 213 is the new state of the processor which will be stored in the processor one-bit memory cell if such cell is selected.

It should be appreciated that the specific clocking of the processors $P_{i,j}$ via the column and row selection circuits will depend on the specific implementations of the processors. Thus, for the example of clocked D-type flip-flop memory cells, the column and row select signals would be controlled to transition to the active state only after the op-code and external inputs are valid (i.e., the op-code word is provided early in the clock cycle). Thus, in each clock cycle the selected column and row select signals will transition to the active state and then to the inactive state. In this manner, the new state of a processor does not affect the logical function involving the present output of the processor.

Although not explicitly shown, it should also be appreciated that initializion of the outputs $S_{i,j}$ of the processors $P_{i,j}$ will depend on the particular implementation. For the clocked D-type flip-flop memory cells, the outputs can be preset or cleared by separate control lines (not shown) or by defining an op-code which forces the outputs of selected processors to be a logical one or zero (e.g., high voltage or low voltage).

With the understanding of the foregoing clocking and initialization considerations, the general operation of the mesh processor is as follows. The processors are initialized (e.g., preset, cleared, reset, or set) and external data is made available via an input data register. Also, an op-code word, a column select word CSELECT, and a row select word are made available by the controller 20. The selected processors are then clocked by the column and row select signals $C_i$, $R_j$. The procedure of providing external data, an op-code word, a column select word, and a row select word are then repeated, and followed by appropriate clocking via the column and row select signals $C_i$, $R_j$. The output of the processor array can be provided to an output register, for example.

As discussed previously, only those processors selected by the column and row select signals are clocked and can change their output states, depending on the op-code and the states of the operands. The output states of the processors not selected are not changed.

Referring now to FIGS. 6A-6M, a 3 by 3 processor array having processors that provide the functions set forth in Tables I and II, above, will now be discussed relative to the addition of two 3-bit unsigned binary integers X, Y stored in the top and middle rows (i.e., rows 3 and 2) of the array, with the least significant bits to the right (i.e., column 3 has the least significant bit for each row). The binary integers X, Y can be loaded into the rows 3 and 2 by loading X into an input register at the top of the array, copying the contents of the register into the row 3 processors, loading Y into the input register, copying the contents of the row 3 processors into the row 2, and copying the input register contents into the row 3.

Starting with the initial condition of the integers X, Y in rows 3 and 2 as depicted in FIG. 6A for the integers 2 and 3, the following Table III sets forth the necessary steps for placing the sum (A+B mod 8) in row 1 of the array.

TABLE III

| Step | Col. | Row | Logical Operation | Input Direction | FIG. |
|---|---|---|---|---|---|
| 1 | All | 1 | COPY | N | 6B |
| 2 | All | 3 | XOR | S | 6C |
| 3 | All | 2 | XOR | N | 6D |
| 4 | All | 1 | AND | N | 6E |
| 5 | All | 2 | OR | N | 6F |
| 6 | 3 | 2 | COPY | S | 6G |
| 7 | 2 | 2 | AND | E | 6H |
| 8 | 2 | 2 | OR | s | 6I |
| 9 | 1,2 | 2 | COPY | E | 6J |
| 10 | 3 | 2 | RESET | None | 6K |
| 11 | All | 2 | XOR | N | 6L |
| 12 | All | 1 | COPY | N | 6M |

(XOR denotes the exclusive OR function)

The foregoing has been a disclosure of a mesh processor array that utilizes an efficient processor cell, can be clocked at higher rates, provides computational flexibility and provides for efficient memory utilization. The array architecture readily and efficiently implements defined synchronous logic, for example, pursuant to appropriate sequences of instructions based on the particular logical functions of such defined synchronous logic. And due to the flexibility of the disclosed processor array, the resulting implementation of the particular logical functions can be adapted to provide for more efficient and faster processing, for example by logic minimization techniques. As a particular example of the flexibility of the disclosed processor array, persons skilled in the art will appreciate that existing algorithms designed for known parallel processor arrays having more memory per processor cell can be implemented with the disclosed processor array, for example, by grouping multiple bit cells of the invention for each of the multiple bit memory cells.

Although the foregoing has been a description and illustration of specific embodiments of the invention, various modifications and changes thereto can be made by persons skilled in the art without departing from the scope and spirit of the invention as defined by the following claims.

What is claimed is:

1. A mesh processor array comprising:
   a plurality of single bit logic processor cells each including:
   (a) logic means for receiving a plurality of one-bit inputs and a control word for performing a logical operation on 0 or more of the plurality of inputs to provide a one-bit logic means output, wherein the 0 or more of the plurality of inputs and the logical operation are specified by the control word, and
   (b) one-bit memory means controllably enabled to store the one-bit output of said logic means and providing a one-bit output that comprises a one-bit output of the processor cell that is provided as one of the one-bit inputs to said logic means, said one-bit memory means comprising an only memory element of the processor cell such that the processor cell contains no other memory elements, and wherein said inputs to said logic means includes one-bit outputs from other ones of said plurality of processor cells;
   control means for providing a control word in parallel to all of said plurality of single bit processor cells, such that each single bit processor cell receives said control word which specifies a logical operation; and
   selection means for enabling selected processor cells to perform the logical operation specified by said control word;
   whereby said plurality of single bit processor cells operate in parallel pursuant to receiving said control word and subsequent selective enablement by said selection means.

2. The mesh processor array of claim 1 wherein said plurality of processor cells are arranged in a matrix of columns and rows.

3. The mesh processor array of claim 2 wherein said selection means comprises a column selection circuit and a row selection circuit.

4. The mesh processor array of claim 3 wherein said plurality of processor cells are arranged in a matrix of columns and rows with interior processor cells, corner perimeter processor cells, and non-corner perimeter processor cells, wherein:
   each interior processor cell receives as inputs the outputs of four adjacent processor cells;
   each corner perimeter cell receives as inputs (i) the outputs of two adjacent processor cells, and (ii) two external inputs;
   each non-corner perimeter processor cell receives as inputs (i) the outputs of three adjacent processor cells, and (ii) an external input.

5. The mesh processor array of claim 4 wherein inputs to the processor array are provided as external inputs to the corner perimeter processor cells and the non-corner perimeter processor cells, and wherein the one-bit outputs of the corner perimeter processor cells and the non-corner perimeter processor cells comprise outputs of the array.

6. The mesh processor array of claim 1 wherein said one-bit memory means comprises a clocked memory device which is clocked by a selection signal provided by said selection means.

7. The mesh processor array of claim 6 wherein said clocked memory device comprises a flip-flop.

* * * * *